United States Patent Office

3,829,294
Patented Aug. 13, 1974

3,829,294
BY-PASS VALVE CONTROL
George O. Smith, Ferndale, Mich., assignor to General
Motors Corporation, Detroit, Mich.
Filed Aug. 21, 1972, Ser. No. 282,433
Int. Cl. F01n 3/14
U.S. Cl. 23—288 F          1 Claim

ABSTRACT OF THE DISCLOSURE

A device to protect a catalytic converter from overheating which includes a valve normally directing exhaust gas flow into the catalytic converter, a chamber containing compressed fluid and having one wall comprising a flexible diaphragm linked to the valve and held against a compressed spring by the compressed fluid, a fluid conduction passage between the chamber and the interior of the catalytic converter, and a fusible plug in the passage within the catalytic converter which melts at a predetermined temperature to allow the compressed fluid to escape and the spring to move the valve to direct the exhaust gases around the catalytic converter.

SUMMARY OF THE INVENTION

One method suggested for reducing the quantity of undesirable constituents in engine exhaust gases is the use of a catalytic converter in the engine exhaust system. In such a converter, the presence of one or more catalysts causes chemical reactions which result in many of the undesirable constituents being converted into less undesirable substances. In such reactions heat is usually generated, but a properly designed converter is capable of dissipating this heat under normal circumstances.

It is well known, however, that certain engine malfunctions, such as ignition failure, stuck choke and others, are sometimes capable of producing such a great amount of heat within the converter that it cannot be adequately dissipated; and the temperature within the converter may rise until the catalyst is destroyed or the converter grid material experiences structural failure. Although a number of devices have been proposed to protect the converter against damage due to excessive heat, most of these devices are complex, expensive, or subject to failure themselves.

This invention provides a device for the protection of a catalytic converter which is simple and relatively inexpensive and which provides fail-safe operation. It generally comprises a valve in the exhaust gas passage upstream from the catalytic converter which is constructed with a continuous bias toward a position to bypass exhaust gas flow around the converter, but which is provided with a stronger opposing bias to position the valve to direct exhaust gas flow through the converter. A predetermined temperature within the catalytic converter causes loss of the latter bias, which allows the former bias to operate to protect the converter. Since this former bias is continuously present, it will also operate if the latter bias is lost because of some system malfunction.

The details as well as other objects and advantages of this invention are set forth in the drawings and the description of the preferred embodiment.

DESCRIPTION OF THE PREFERRED EMBODIMENT

Figure 1:
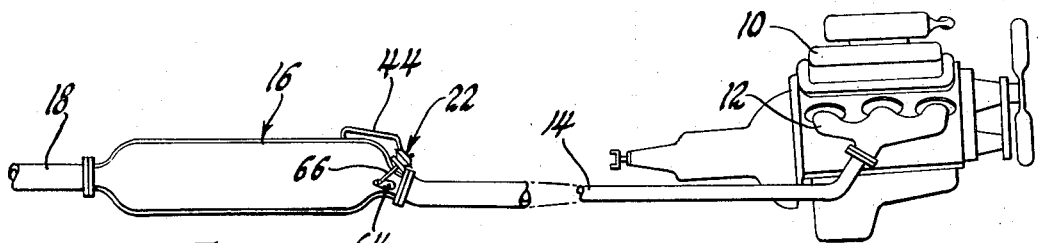
FIG. 1 shows a preferred embodiment of the invention in its enviroment.

Referring to FIG. 1, the engine 10 is illustrated as having an exhaust manifold 12, to which is connected an exhaust passage 14. The exhaust passage 14 conducts exhaust gases to a catalytic converter 16, through which they must normally pass on their way to tailpipe 18.

Figure 2:
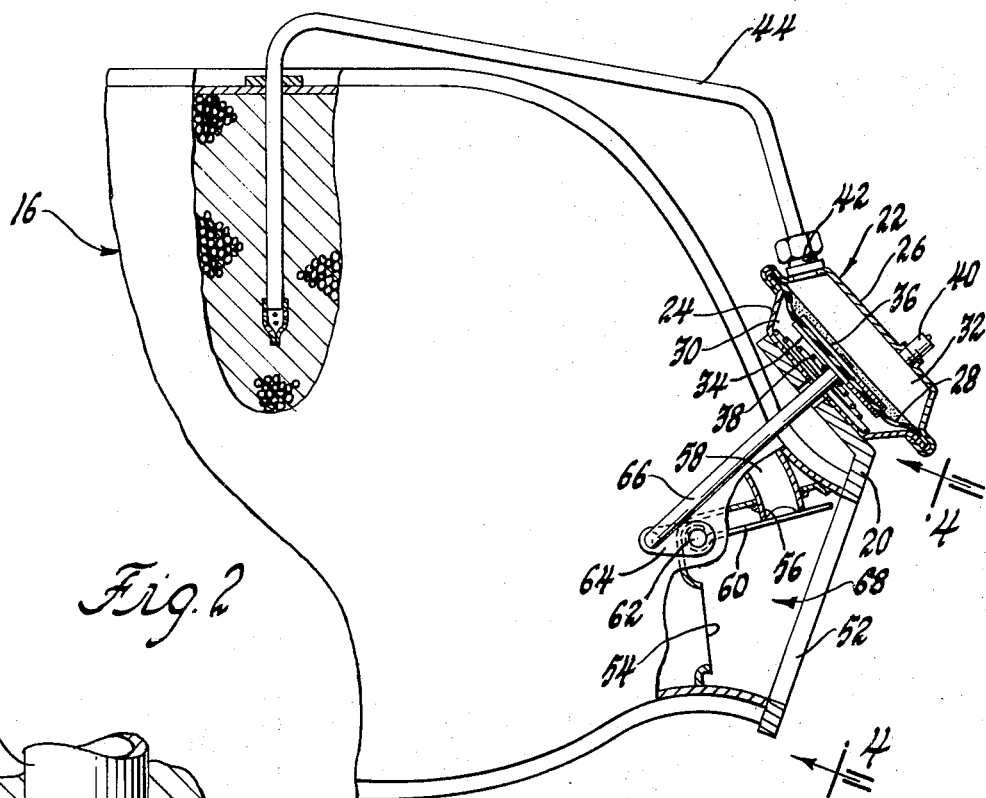
FIG. 2 is a cut-away drawing which shows the internal structure of the preferred embodiment shown in FIG. 1.

Referring to FIG. 2, a bracket 20 is fixed to the catalytic converter 16. To the bracket 20 is fixed an expansible chamber motor, generally shown as pneumatic actuator 22. The pneumatic actuator 22 has an enclosure composed of oppositely convex members 24 and 26, and has an internally mounted flexible diaphragm 28, which divides it internally into two chambers 30 and 32. The diaphragm 28 is sandwiched between disks 34 and 36, which are free to move with the diaphragm 28. Within the chamber 30, a spring 38 biases the diaphragm 28 and disks 34 and 36 away from the convex member 24 so as to decrease the size of chamber 32. However, the chamber 32 is normally filled with a compressed fluid such as air at a pressure, for example, of 10 p.s.i.g. The force of this compressed fluid on the diaphragm 28 is sufficient to push the diaphragm 28 and disks 34 and 36 toward the convex member 24 annd cause the spring 38 to be compressed. This compressed fluid can be introduced into the chamber 32 through Schrader valve 40.

Figure 3:
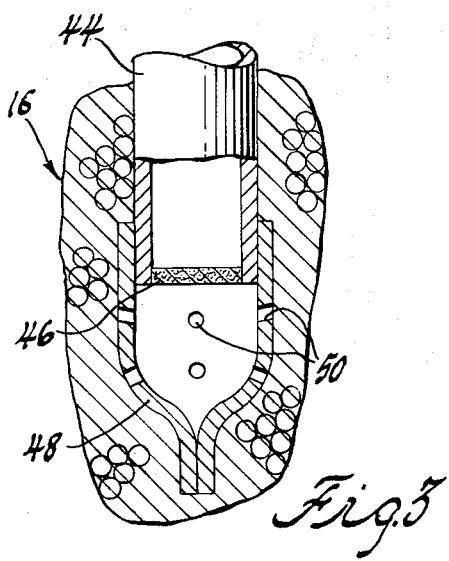
FIG. 3 is an enlargement of a portion of FIG. 2 which shows the mounting of the fusible plug.
Figure 4:
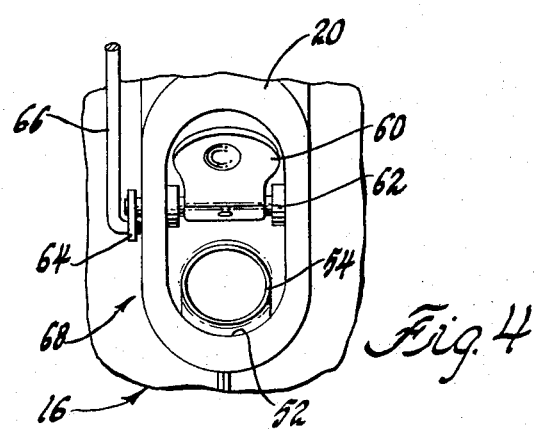
FIG. 4 is a view along line 4—4 in FIG. 2.

Open to the chamber 32 through a fitting 42 is a compressed fluid passage 44. The compressed fluid passage 44 is a tube that extends from the pneumatic actuator 22 into the interior of the catalytic converter 16 and ends in a region whose temperature is to be monitored. The tube which forms the compressed fluid passage 44 is closed at its converter end by a fusible plug 46, which is shown in FIG. 3. The fusible plug 46 consists of a common braze which is chosen to melt at a preselected critical temperature. A protective cap 48 pierced by holes 50 is clamped over the end of the tube 44 to separate the catalyst from the fusible plug 46.

Returning to FIG. 2, the catalytic converter 16 has an exhaust gas inlet 52. Opening from the exhaust gas inlet 52 are the converter inlet valve seat 54, through which the exhaust gases pass into the catalytic converter itself, and the converter bypass valve seat 56, through which exhaust gases pass into a converter bypass passage 58 and are bypassed around the catalyst into the tailpipe 18. A valve member 60 fixed to a shaft 62 swings around the axis of the shaft 62 so as to block either the converter inlet valve seat 54 or the converter bypass valve seat 56. An arm 64 is attached in fixed angular relation to the shaft 62. The arm 64 is linked by a rod 66 to the diaphragm 28 of pneumatic actuator 22, so that movement of the diaphragm 28 to compress the spring 38 causes the valve member 60 to close the converter bypass valve seat 56 and the opposite movement of diaphragm 28 causes the. valve member 60 to close the converter inlet valve seat 54. The converter inlet valve seat 54, converter bypass valve seat 56, valve member 60 and shaft 62 together form a valve 68 which is shown in this embodiment as a flap valve integral with the catalytic converter 16. However, my invention does not require any particular kind of valve or any particular placement for the valve as long as the valve is upstream from the catalyst in the converter 16.

The operation of the device will now be described. It has already been stated that the chamber 32 is normally filled with a compressed fluid such as compressed air. The compressed fluid passage 44, being open to the chamber 32, is also filled with this compressed fluid at the same pressure. The pressure of this compressed fluid biases the diaphragm 28 against the spring 38 and causes the rod 66 and arm 64 to hold the valve member 60 so as to block the converter bypass valve seat 56. In normal operation, therefore, all exhaust gases will flow through the converter inlet valve seat 54 into the catalyst.

However, should the temperature within the catalytic converter 16 reach the melting point of the fusible plug 46, the fusible plug 46 will lose its rigidity. The compressed fluid within the chamber 32 and compressed fluid passage 44 will then push the fusible plug 46 out of the end of the compressed fluid passage 44 and will itself escape through the holes 50 into the catalytic converter 16. As the pressure within chamber 32 decreases, the spring 38 will expand, thus moving the diaphragm 28, rod 66 and arm 64 to rotate the valve member 60 to close the converter inlet valve seat 54. The exhaust gases must now all pass into the converter bypass passage 58. The converter bypass passage 58 can be made narrow and constrictive enough to produce a noticeable change in engine operation that will give the driver of the vehicle notice of the change.

My bypass valve control is simple and reliable. It is fail-safe in operation since the spring 38 exerts a continuous bias which will close the converter inlet valve 54 should any appreciable leakage of compressed fluid occur. It provides means for giving the vehicle operator notice of its operation without any additional parts. The pneumatic actuator 22 can be cycled to keep the rod 66, arm 64 and valve member 60 moving freely by emptying and refilling the chamber 32 with compressed fluid through the Schrader valve 40. This could be done on a regular basis in the vehicle's normal periodic check-ups. It should be noted that the preferred embodiment herein described is not the only embodiment of my invention that will occur to those skilled in the art; and the invention should not be limited to this description.

I claim:
1. The combination of:
   a catalytic converter in an engine exhaust system, the catalytic converter containing a catalyst material;
   a by-pass passage in the engine exhaust system for directing exhaust gases around the catalytic converter;
   a valve controlling the entrance of exhaust gases to the catalytic converter and by-pass passage, the valve being movable between a first position admitting such gases to the converter and blocking the by-pass passage and a second position admitting such gases to the by-pass passage and blocking the converter;
   an expansible chamber motor having a chamber and a movable wall, the movable wall being linked to the valve for co-movement therewith, the expansible chamber motor including spring means to bias the valve toward its second position;
   a tube having a first end open to the chamber and a second end within the catalyst material, the tube defining an outlet for the chamber;
   a fusible plug in the second end of the tube, the fusible plug normally blocking the outlet, the fusible plug further being in thermal communication with the catalyst material and effective to fuse upon reaching a predetermined elevated temperature;
   a pressurized fluid normally retained in the chamber by the fusible plug so as to hold the movable wall and valve in the first position against the bias of the spring means, the pressurized fluid being effective, upon fusing of the fusible plug, to push the plug out of the tube and thereby escape from the chamber, whereupon the spring means moves the movable wall and valve to the second position.

References Cited
UNITED STATES PATENTS

| | | | |
|---|---|---|---|
| 3,083,084 | 3/1963 | Raymond | 23—288 F |
| 3,197,287 | 7/1965 | Innes et al. | 23—288 F |
| 3,094,394 | 6/1963 | Innes et al. | 23—288 F X |
| 3,260,566 | 7/1966 | Fisher | 23—288 F X |

JOSEPH SCOVRONEK, Primary Examiner

U.S. Cl. X.R.

60—277, 288